May 31, 1932. C. A. CAMPBELL 1,860,451
AIR BRAKE
Filed Oct. 9, 1930
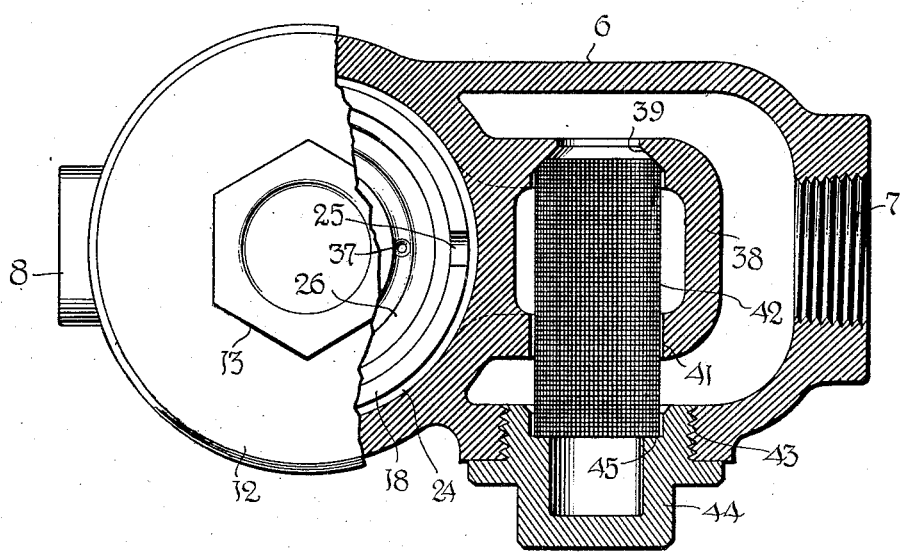
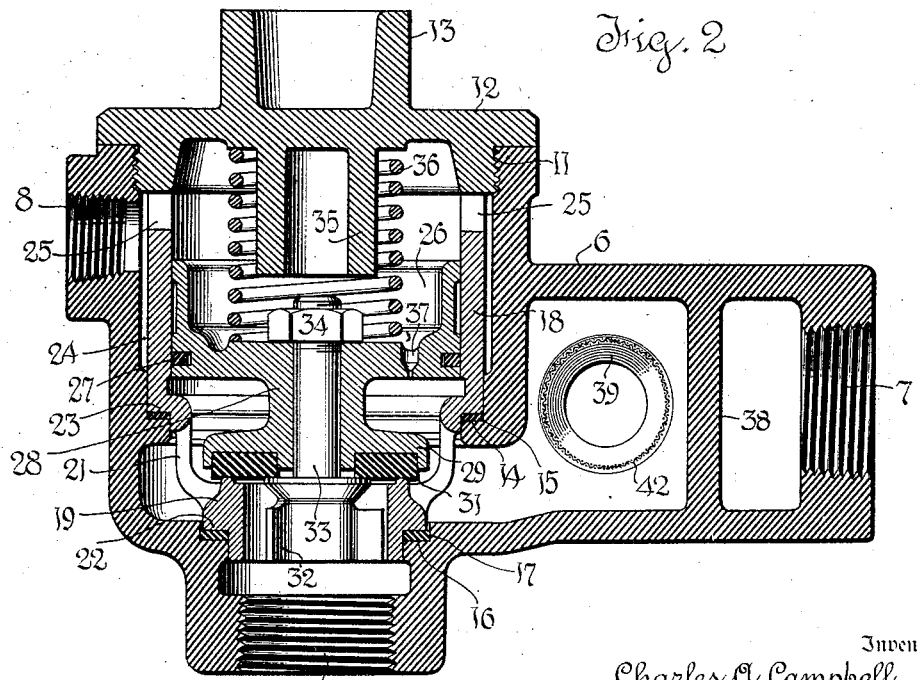
Inventor
Charles A. Campbell
By
Attorneys Patented May 31, 1932

1,860,451

UNITED STATES PATENT OFFICE

CHARLES A. CAMPBELL, OF WATERTOWN, NEW YORK, ASSIGNOR TO THE NEW YORK AIR BRAKE COMPANY, A CORPORATION OF NEW JERSEY

AIR BRAKE

Application filed October 9, 1930. Serial No. 487,617.

This invention relates to deadman emergency valves. The purpose of the invention is to improve the construction and produce a device from which the working parts may be removed without the necessity of breaking any pipe joints.

The preferred embodiment of the invention is illustrated in the accompanying drawings, in which,—

Fig. 1 is a view, partly in plan and partly in section, on the line 1—1 of Fig. 2.

Fig. 2 is a vertical axial section.

The device is supported in a body casting 6. This is formed with a threaded connection 7 for the brake pipe, a smaller threaded connection 8 for a control pipe, and a vent passage 9 which leads to atmosphere. The vent passage 9 is shown threaded, beause in some installations it is desired to attach a vent pipe leading to some special point of discharge.

The body 6 is formed with a cylindrical chamber which is conveniently coaxial with the vent passage 9, and which, at the opposite end is open and threaded, as indicated at 11, to receive a removable closure cap 12. This closure cap is formed with a hexagonal hollow boss 13 to receive a wrench, by means of which the cap is mounted in place and removed.

The cylindrical portion of the body 6 is provided at its lower end with an annular inwardly extending flange or shoulder 14, upon which is mounted a gasket 15. Coaxial with the annular shoulder 14 is a second annular shoulder 16 which surrounds the upper or inner end of the discharge passage 9, and which serves as a seat for a second gasket 17.

Freely insertible through the open side of the body 6 when the cap 12 is removed, is a unitary structure comprising a cylinder bushing 18, a valve seat member 19 and connecting arms 21 which form a spider. The valve seat member 19 is provided with an annular shoulder 22 which seats on the gasket 17. The lower end of the cylinder bushing 18 forms a shoulder 23 which surrounds the upper ends of the arms 21 and which seats on the gasket 15. The threaded boss of the cap 12 seats on the upper end of the cylinder bushing 18 and forces this downward, simultaneously compressing both of the gaskets 15 and 17. The body is counterbored to provide an annular chamber 24 surrounding the upper portion of the bushing, and this is notched, as indicated at 25, to provide a passage from the interior of the bushing to the controlling pipe connection 8.

Slidably mounted in and guided by the bushing 18 is a skirted piston 26 having one sealing ring 27. The ring 27 is an ordinary snap ring. Formed integral with the piston 26 and connected thereto by a reduced neck 28 is a valve body 29. This has a rubber or other suitable seating face 31 which coacts with the valve seat 19. To assist in guiding the valve and to confine the gasket 31, there is provided a winged pilot 32 formed integrally with the stem 33. The stem 33 extends through the valve body 29 and the reduced neck 28, into the space above the piston 26 where it receives a nut 34. The nut holds the parts in assembled relation.

The parts 18 to 23 and 25 to 34 make up a valve and motor unit which is insertible through the open side of the body 6.

The cap 12 carries a downwardly extending annular stop member 35 which coacts with the nut 34 and serves to limit the upward motion of the piston and valve. A spring 36 surrounding the boss 35, reacts between the cap 12 and the piston 26 and urges the piston 26 and valve 29 in a downward (valve closing) direction. A minute equalizing port 37 connects the spaces above and below the piston 26. The space below the piston 26 and immediately above the valve 29, is in free communication with the brake pipe connection 7.

In the construction shown in the drawings, a removable strainer is interposed. To that end the body 6 is formed with a partition 38, U-shaped in plan (see Fig. 1), and formed at one side with a conical seat aperture 39, and on the other side with a circular aperture 41. A cylindrical gauze strainer 42 is inserted through the second aperture, and seats at its end against the conical portion of the first aperture. This strainer is removable, and is inserted through a threaded aperture 43 formed in one wall of the body 6 and closed by a threaded cap 44. The cap 44 is provided with a shoulder 45, against which the outer end of the strainer element 42 seats. The cap 44 thus holds the strainer element tightly in position, and upon removal of the cap, the strainer element may be readily withdrawn.

The valve above described is in effect a relay vent valve. Under normal conditions the control pipe, connected at 8, is closed so that brake pipe air flows through the strainer 42 to the space below the piston 26, then flows through the port 37 to the space above this piston, until the pressures above and below the piston equalize. Under such conditions the spring 36 maintains the valve 29 in its seated or closed position. If the connection 8 be vented to atmosphere, the port 37 is inadequate to maintain the equalization of pressure, and the preponderating pressure, acting on the lower side of the piston 26, forces this upward against the resistance of the spring 36, and vents the brake pipe directly to atmosphere through the passage 9.

Relay vent valves having this operative characteristic are well known and are customarily used with what are known as deadman's valves. These valves have a normal opening tendency, and must be held closed by the operator. Some types are associated with controller handles; others with brake valve handles, and still others are of the foot-operated type, requiring the operator to keep his foot on the valve. The idea underlying all of these mechanisms is to insure attention by the operator and that he remain continuously at his post. Should he release the valve, either through inattention, or because of illness, the valve will open and vent the space above the piston 26, thus causing the vent valve 29 to open.

As heretofore constructed the failure of any working part of the relay valve, required the dismounting of the entire valve body, and the breaking of at least two pipe joints. The present construction permits the withdrawal of the working parts of the valve and the substitution of new parts while the valve body remains connected. Thus, unless the valve body itself be damaged, repairs can be made without breaking any pipe joints. The removable strainer in conjunction with a device of this sort, greatly simplifies maintenance.

While I have illustrated the best form of the device known to me, the inventive concept is capable of embodiment in specifically different forms, and no necessary limitation to the particular form illustrated, is implied.

What is claimed is:—

1. In a deadman emergency vent valve, the combination of a ported body having an open side; a valve and motor unit bodily insertible through said open side, and including a cylinder and valve seat rigidly connected together and a piston and valve rigidly connected together, the piston working in said cylinder and the valve coacting with said seat; gasket means for sealing said cylinder and seat to said body, in coactive relation with parts therein; and a removable closure for said open side serving to force said cylinder and seat against said gasket means.

2. In a deadman emergency vent valve, the combination of a ported body having an open side; a valve and motor unit bodily insertible through said open side, and including a cylinder and valve seat rigidly connected together and a piston and valve rigidly connected together, the piston working in said cylinder and the valve coacting with said seat; gasket means for sealing said cylinder and seat to said body, in coactive relation with parts therein; and a removable closure for said open side threaded to said body and serving to force said cylinder and seat against said gasket means.

3. In a deadman emergency vent valve, the combination of a body having a control pipe connection, a brake pipe connection, and a vent passage communicating through the body with said brake pipe connection, said body being formed with one open side; a bushing structure removably mounted in said body, insertible through said open side and including a cylinder bushing, a valve seat registering with said vent passage and a connecting spider, the cylinder bushing being ported adjacent its end to afford communication from the interior of said bushing to said control pipe connection; gasket means for sealing said cylinder bushing and said valve seat to said body; a cap removably mounted on said body to close said open side and seat said bushing structure against said gasket means; a ported piston slidably mounted in said cylinder bushing; a valve carried by said piston and adapted to close against said seat; and a spring urging said valve in a seating direction.

In testimony whereof I have signed my name to this specification.

CHARLES A. CAMPBELL.